United States Patent [19]

Gladden

[11] 4,155,986

[45] May 22, 1979

[54] DUAL CATALYST NITRIC OXIDE REDUCTION

[75] Inventor: John R. Gladden, Metamora, Ill.

[73] Assignee: Caterpillar Tractor Co., Peoria, Ill.

[21] Appl. No.: 907,090

[22] Filed: May 18, 1978

Related U.S. Application Data

[63] Continuation-in-part of Ser. No. 802,207, May 31, 1977.

[51] Int. Cl.$^2$ .............................................. B01D 53/00
[52] U.S. Cl. ..................................... 423/212; 423/239; 422/115; 422/171; 422/173; 60/288
[58] Field of Search ........... 423/212 C, 239, DIG. 13; 60/288, 301; 422/115, 171, 173

[56] References Cited

U.S. PATENT DOCUMENTS

| | | | |
|---|---|---|---|
| 3,150,922 | 9/1964 | Ashley | 60/288 |
| 3,222,140 | 12/1964 | Scivally et al. | 23/288 FA |
| 3,961,020 | 6/1976 | Seki | 423/239 A |
| 4,031,185 | 6/1977 | Akimoto et al. | 423/239 A |

FOREIGN PATENT DOCUMENTS 411377 6/1934 United Kingdom ...................... 60/301

*Primary Examiner*—G. O. Peters
*Attorney, Agent, or Firm*—Phillips, Moore, Weissenberger, Lempio & Majestic

[57] ABSTRACT

Exhaust gases from diesel and some other engines vary in temperature from about 100° C. to about 800° C. Exhaust is passed along with ammonia to a first reactor wherein the ammonia reduces nitric oxide at temperatures down to a threshold temperature between about 220° C. to about 280° C. Above this threshold temperature the effluent from the reactor is passed to the exhaust. When the first reactor effluent is at a temperature below the threshold temperature, it is passed through a second reactor after intermediate cooling, wherein it contacts an ammonium halide on activated charcoal catalyst at a temperature of 100° C. to 170° C., which catalyst catalizes the low temperature reduction of nitric oxide with ammonia.

5 Claims, 1 Drawing Figure

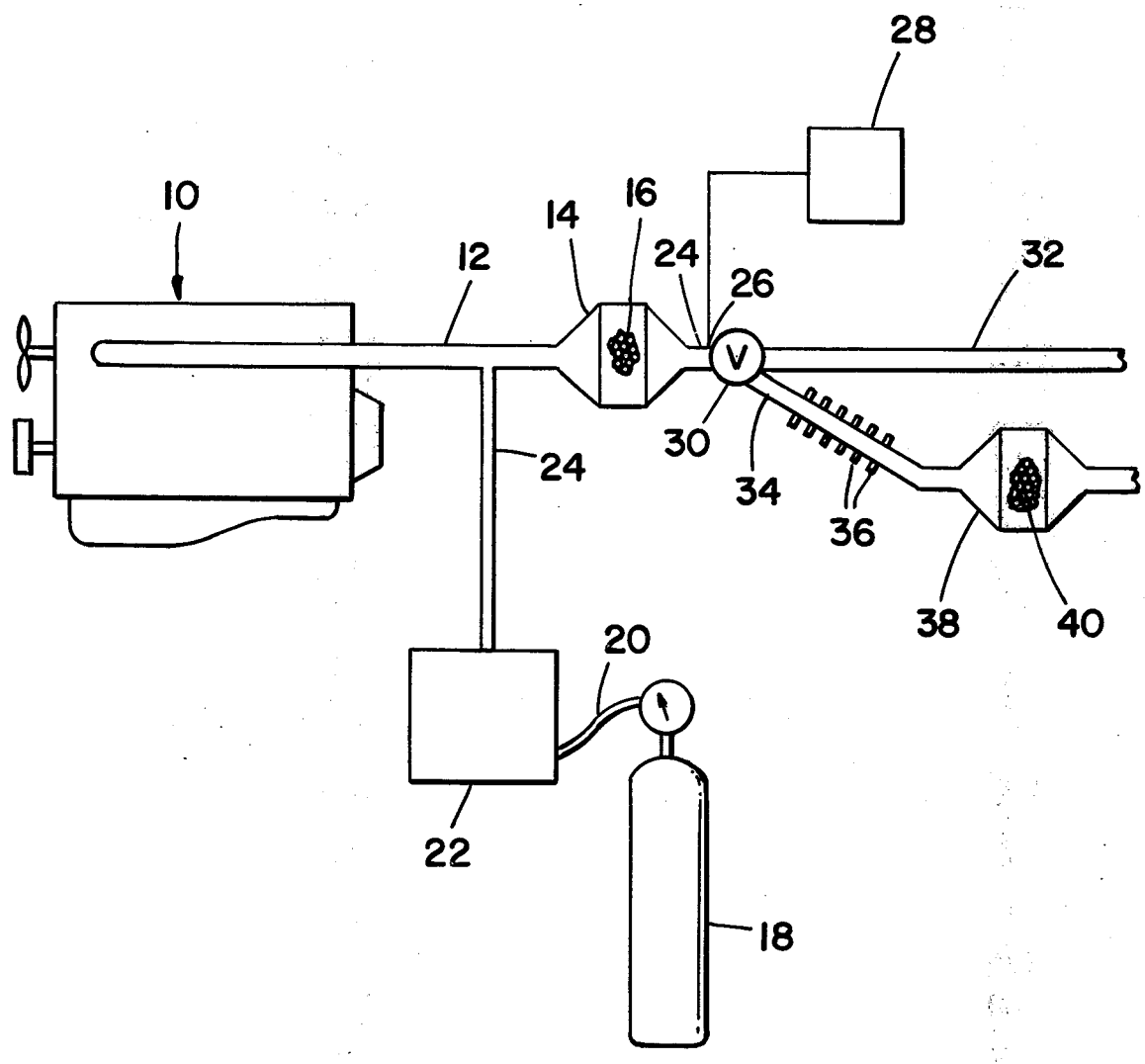
FIG_1

DUAL CATALYST NITRIC OXIDE REDUCTION

CROSS REFERENCE TO RELATED APPLICATION

This application is a continuation-in-part of copending U.S. application, Ser. No. 802,207, filed May 31, 1977.

BACKGROUND OF THE INVENTION

1. Field of the Invention

The invention relates to reduction of nitric oxide content in combusted gas streams wherein the temperature of the combusted gas streams vary over a wide range. Such conditions are found, for example, in diesel and in other hydrocarbon-burning engines.

2. Prior Art

The prior art teaches exhaust gas nitric oxide reduction through reaction with ammonia over a nitric oxide reduction catalyst at temperatures above about 260° C. The prior art also teaches that ammonium halides and especially ammonium bromide on activated charcoal catalyze the reduction of nitric oxide with ammonia at temperatures in the range from 100° C. to 170° C. This latter system has however not been used in practical applications such as engine exhaust streams wherein the temperature of the gas contacting the catalyst will exceed about 170° C. because the catalyst will be destroyed if subjected to exhaust temperatures significantly above about 170° C. The more thermally stable nitric oxide reduction catalysts as are used on engine exhausts are, however, of reduced efficiency below about 260° C., and are relatively inefficient below about 220° C. Accordingly, if one makes use of only the normal prior art high temperature stable nitric oxide reduction catalysts on exhaust gases, high nitric oxide contents occur whenever the temperature of the exhaust stream being fed into the catalyst bed is below about 220° C., and relatively high nitric oxide contents tend to occur between about 220° C. up to about 280° C. This often occurs in practice. For example, at idle a diesel engine may have an exhaust temperature of only about 100° C. This is clearly a highly undesirable state of affairs.

SUMMARY OF THE INVENTION

The present invention is directed to overcoming one or more of the problems as set forth above.

According to the present invention there is provided a process for reducing the nitric oxide content of a combusted gas stream. The process comprises contacting a varying temperature combusted gas stream which comprises nitric oxide and ammonia with a first catalyst comprising a porous inorganic oxide nitric oxide reduction catalyst in a first reactor to form a first reactor effluent. The temperature of the first reactor effluent is determined. When the temperature is above a threshold temperature in the range between about 220° C. to about 280° C., the first reactor effluent is simply conducted to exhaust. When the temperature is below the threshold temperature, the first reactor effluent is cooled by cooling means to a temperature which falls within a range from about 170° C. to about 100° C. to form a cooled effluent. The cooled effluent is contacted with a catalyst comprising an ammonia halide at a temperature within a range from about 170° C. to about 100° C.

The invention further relates to apparatus for carrying out a process generally as set out above.

BRIEF DESCRIPTION OF THE DRAWING

The invention will be better understood by reference to the single figure of the drawing wherein:

FIG. 1 illustrates schematically the process and apparatus of the present invention.

DETAILED DESCRIPTION OF THE PREFERRED EMBODIMENT

Adverting to FIG. 1, there is illustrated therein a diesel or other engine 10 which provides an exhaust gas stream at a varying temperature depending upon load conditions. Generally the condition of the engine 10 will vary within a range from about 100° C. to 800° C. A combusted gas stream from the engine 10 passes via a conduit 12 to a first reactor 14 having a catalyst 16 therewithin. Ammonia passes from an ammonia storage tank 18 via a conduit 20, a feed control valve 22 and a conduit 24 to combine with the combusted gas stream and contact the catalyst 16 in the first reactor 14. The temperature of an effluent gas from the first reactor 14 is measured by a temperature sensor 26. A control 28 of a conventional nature controls the position of a valve 30, e.g., a butterfly valve, responsive to the temperature sensed by the temperature sensor 26. When the temperature sensed by the temperature sensor 26 is above a threshold temperature, the threshold temperature in the range of between about 220° C. to about 280° C., the control 28 causes the valve 30 to direct the first reactor effluent via a conduit 32 to exhaust. The threshold temperature is preferably about 260° C. When the temperature sensor 26 detects a temperature below the threshold temperature, the control 28 directs the valve 30 to direct the first reactor effluent via a conduit 34 to cooling means 36 which may comprise fins on the conduit 34, water cooling pipes, or the like. Cooled first reactor effluent then continues via the conduit 34 to a second reactor 38 having therewithin an ammonium halide catalyst 40. The temperature of the cooled effluent falls within the range from about 170° C. to about 100° C. as does the temperature within the second reactor 38.

Within both the first reactor 14 and the second reactor 38, the reaction occuring may be represented by the overall equation:

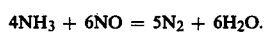

$$4NH_3 + 6NO = 5N_2 + 6H_2O.$$

The catalyst 16 may include any of a number of known porous inorganic oxides for catalyzing the reduction of nitric oxide with ammonia. The porous inorganic oxide can comprise, for example, alumina, zirconia, silica, magnesia, silica-alumina, silica-magnesia, alumina-magnesia, alumina-silica-magnesia, pumice, alundum, titania-silica-alumina, titania-silica, titania-alumina, titania-silica-alumina, titania-magnesia-alumina, and the like. It is generally preferred that the surface area of the porous inorganic oxide be at least about 10m$^2$/g. Generally, a surface area of above about 50m$^2$/g is preferred. The surface area should generally not exceed about 750m$^2$/g and more preferably should not exceed about 500m$^2$/g. Generally, the average pore volume of the porous inorganic oxide will fall within a range from about 0.1ml/g to about 1.5ml/g and more preferably from about 0.2ml/g to about 0.9ml/g. The inorganic oxide can be a naturally or synthetically produced inorganic oxide or a combination of inorganic oxides and preferably comprises a zeolitic aluminosilicate (zeolite). Zeolites are particularly preferred and their use is indeed usually necessitated in order to attain sufficiently high catalytic activity. Also, the zeolites exhibit a high degree of selectivity for catalyzing the reaction between ammonia and nitric oxide. Many naturally or synthetically produced zeolites can be used. X, Y and Z are synthetic mordenite zeolites may be used. Generally it is preferred that the hydrogen form of the zeolite be used since this is especially selective for the reaction between ammonia and nitric oxide. However, rare earth exchanged zeolites, ammonium exchanged zeolites, mordenite type zeolites and such non-zeolite catalysts as copper on alumina, molybdate on alumina, vanadia on alumina, iron-chromium on alumina and gadolinium-vanadium on alumina have also been successfully used as catalysts. Generally, mordenite type zeolites have been used more successfully. Such zeolites are described in great detail in U.S. Pat. No. 3,436,124, patented Apr. 1, 1969. Any of the mordenite zeolites discussed in that patent is useful with varying degrees of efficiency in the practice of the present invention. A number of Y zeolites useful in the practice of the present invention are described in U.S. Pat. No. 3,130,007, patented Apr. 21, 1964. A number of X zeolites useful in the practice of the present invention are described in U.S. Pat. No. 2,882,244 patented Apr. 14, 1959. Once again the particular efficiency of each X type zeolite varies but all of these zeolites work successfully in the practice of the present invention although at different degrees of efficiency.

The reaction upon the catalyst 16 should take place at a temperature which falls within a range from about 220° C. to about 800° C., more preferably from about 260° C. to about 800° C. This reaction should proceed at a gaseous hourly space velocity (at reaction conditions) which falls within a range from about 3,000/hr. to about 40,000/hr. This serves to allow relatively complete reaction of the nitric oxide with the ammonia.

Within the second reactor 38, the reaction conditions will generally include a gaseous hourly space velocity (at reaction conditions) which falls within a range from about 3,000/hr. to about 50,000/hr. The temperature, as previously mentioned, will fall within a range from about 170° C. to about 100° C.

The second catalyst 40 must comprise an ammonium halide, i.e., ammonium chloride, bromide or iodide, preferably ammonium bromide disposed on a porous solid carrier. The porous inorganic oxides useful as the catalyst 16 can serve as the porous solid carrier. An inert porous solid carrier such as charcoal generally activated charcoal, is, however, a preferred carrier. The surface area of the charcoal will generally fall within a range from about $10m^2/g$ to about $750m^2/g$, more preferably from about $50m^2/g$ to about $500m^2/g$. The ammonium halide can be disposed on the carrier by conventional techniques, e.g., the carrier can be simply soaked in a water solution of the halide and then allowed to dry. Generally from about 0.2 to about 30 weight percent of halide is disposed on the carrier based on total weight of the carrier and halide. More preferably, the halide content falls within a range from about 0.5 to about 25 weight percent and still more preferably from about 5.0 to about 20 weight percent.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. A process for reducing the nitric oxide content of a combusted gas stream, comprising:

contacting a varying temperature combusted gas stream which comprises nitric oxide and ammonia with a first catalyst comprising a porous inorganic oxide nitric oxide reduction catalyst in a first reactor to form a first reactor effluent;

determining the temperature of said first reactor effluent;

conducting said first reactor effluent to exhaust when said temperature is above a threshold temperature in the range between about 220° C. to about 280° C.;

cooling said first reactor effluent when said temperature is below the threshold temperature to a temperature which falls within a range from about 170° C. to about 100° C. to form a cooled effluent; and contacting said cooled effluent with a catalyst comprising an ammonium halide on a porous solid carrier at a temperature which falls within a range from about 170° C. to about 100° C.

2. A process as in claim 1 wherein the conducting of said first reactor effluent to exhaust is when said first reactor effluent temperature is above about 260° C.; and the cooling of said first reactor effluent is when said first reactor effluent temperature is below about 260° C.

3. Apparatus for reducing the nitric oxide content of a combusted gas stream, comprising:

means for conducting a varying temperature combusted gas stream from a hydrocarbon burning engine, which gas stream comprises nitric oxide, to a first reactor;

means for conducting ammonia to said first reactor;

means within said first reactor for catalyzing the reduction of the nitric oxide with the ammonia to form a first reactor effluent, said first reactor catalyzing means comprising a first catalyst which comprises a porous inorganic oxide reduction catalyst for nitric oxide;

means for determining the temperature of said first reactor effluent;

means for conducting said first reactor effluent to exhaust when said temperature is above a threshold temperature in the range between about 220° C. to about 280° C.;

means for conducting said first reactor effluent to cooling means only when said temperature is below said threshold temperature and thereat cooling said effluent with said cooling means to a temperature which falls within a range of about 170° C. to about 100° C. to form a cooled effluent;

means for conducting said cooled effluent to a second reactor; and means within said second reactor for catalyzing the reduction of the nitric oxide in the cooled effluent with the ammonia therein to form a substantially nitric oxide free exhaust, said second reactor catalyzing means comprising a second catalyst which comprises an ammonium halide on a porous solid carrier at a temperature which falls within a range from about 170° C. to about 100° C.

4. An apparatus as in claim 3, including a valve which receives said first reactor effluent and control means receiving a signal representative of temperature of said first reactor effluent and shifting said valve to conduct said first reactor effluent to exhaust when said temperature is above a threshold temperature in the range between about 220° C. to about 280° C. and to conduct said first reactor effluent to said cooling means when said temperature is below said threshold temperature.

5. An apparatus as in claim 3 or 4 wherein said threshold temperature is about 260° C.

* * * * *